United States Patent
Finley

Patent Number: 6,142,241
Date of Patent: Nov. 7, 2000

[54] ADJUSTABLE GARDEN PLANTING-DEPTH AND SPACING TOOL

[76] Inventor: Linda Rae Finley, 3470 Mt. Pleasant Rd., Lincoln, Calif. 95648

[21] Appl. No.: 09/252,714

[22] Filed: Feb. 19, 1999

Related U.S. Application Data

[60] Provisional application No. 60/075,770, Feb. 23, 1998.

[51] Int. Cl.[7] .................................................. A01B 45/02
[52] U.S. Cl. .................................................. 172/378
[58] Field of Search .......................... 111/92; 172/21, 172/371, 372, 378

[56] References Cited

U.S. PATENT DOCUMENTS

| | | | |
|---|---|---|---|
| 2,778,291 | 1/1957 | Kerns | 172/21 |
| 2,910,127 | 10/1959 | Saunders | 172/21 |
| 3,148,737 | 9/1964 | Lunsford | 172/21 |
| 3,460,629 | 8/1969 | Shapland, Jr. et al. | 172/21 |
| 3,794,121 | 2/1974 | Drozak | 172/21 |
| 4,154,305 | 5/1979 | Prewett | 172/21 |
| 4,192,387 | 3/1980 | Stinson | 172/21 |
| 4,511,004 | 4/1985 | Deneen | 172/21 |
| 4,858,697 | 8/1989 | Sherblom | 172/21 |
| 5,460,229 | 10/1995 | Mattis | 172/21 |
| 5,615,744 | 4/1997 | Krafka | 172/21 X |
| 5,632,342 | 5/1997 | Knoblich et al. | 172/21 |
| 5,813,471 | 9/1998 | Ramsey | 172/21 |
| 5,868,206 | 2/1999 | Miller | 172/21 |
| 5,934,055 | 8/1999 | Steele | 172/21 X |

*Primary Examiner*—Christopher J. Novosad

[57] ABSTRACT

An adjustable garden planting-depth and spacing tool consists of a handle and five pointed pegs that can be inserted in any or all of the five holes in the handle and secured temporarily by hitch pins. Multiple drills and furrows can be formed in prepared soil faster and easier, while the depth and spacing can easily be adjusted to accommodate a variety of planting requirements.

1 Claim, 2 Drawing Sheets

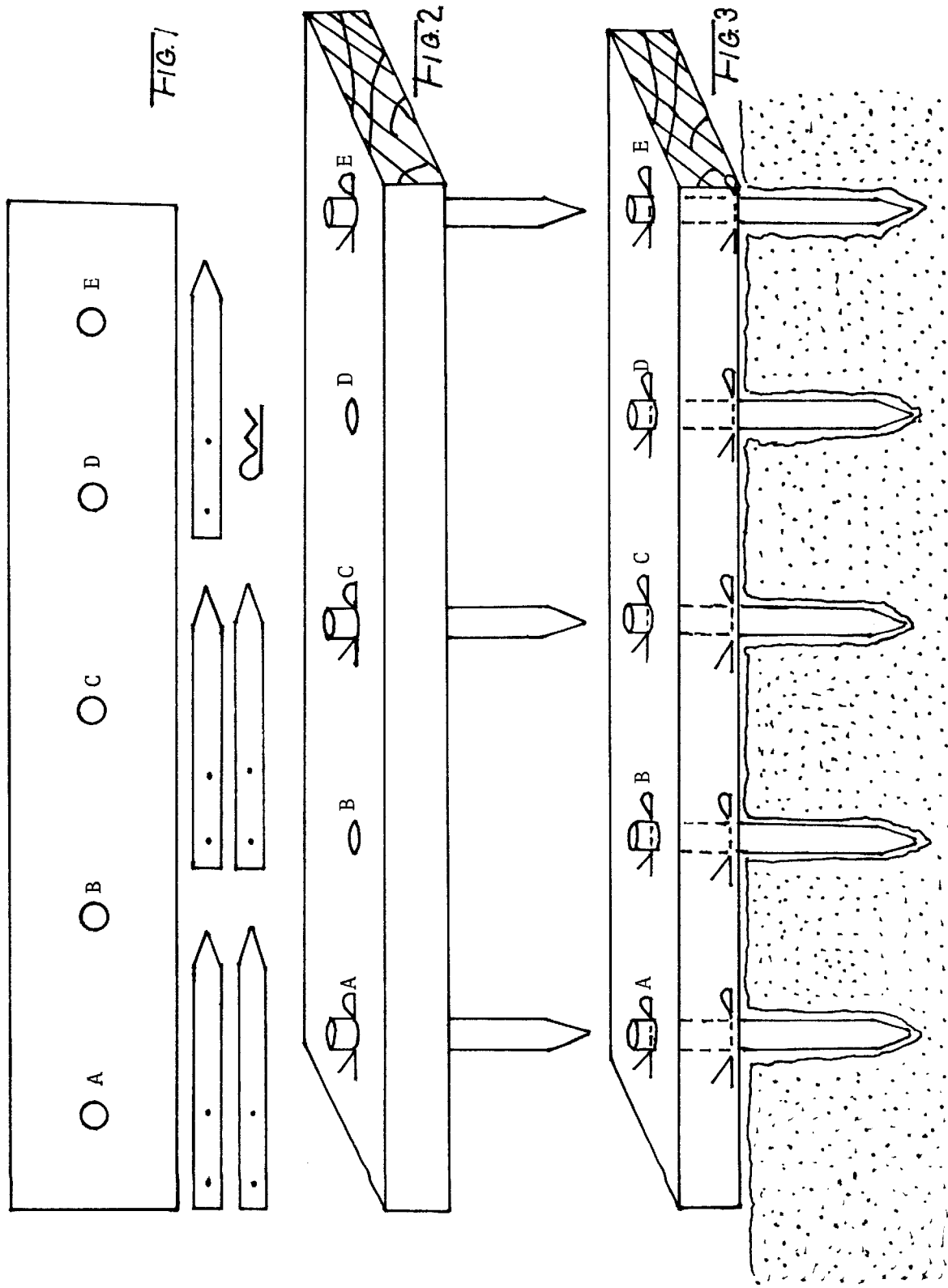

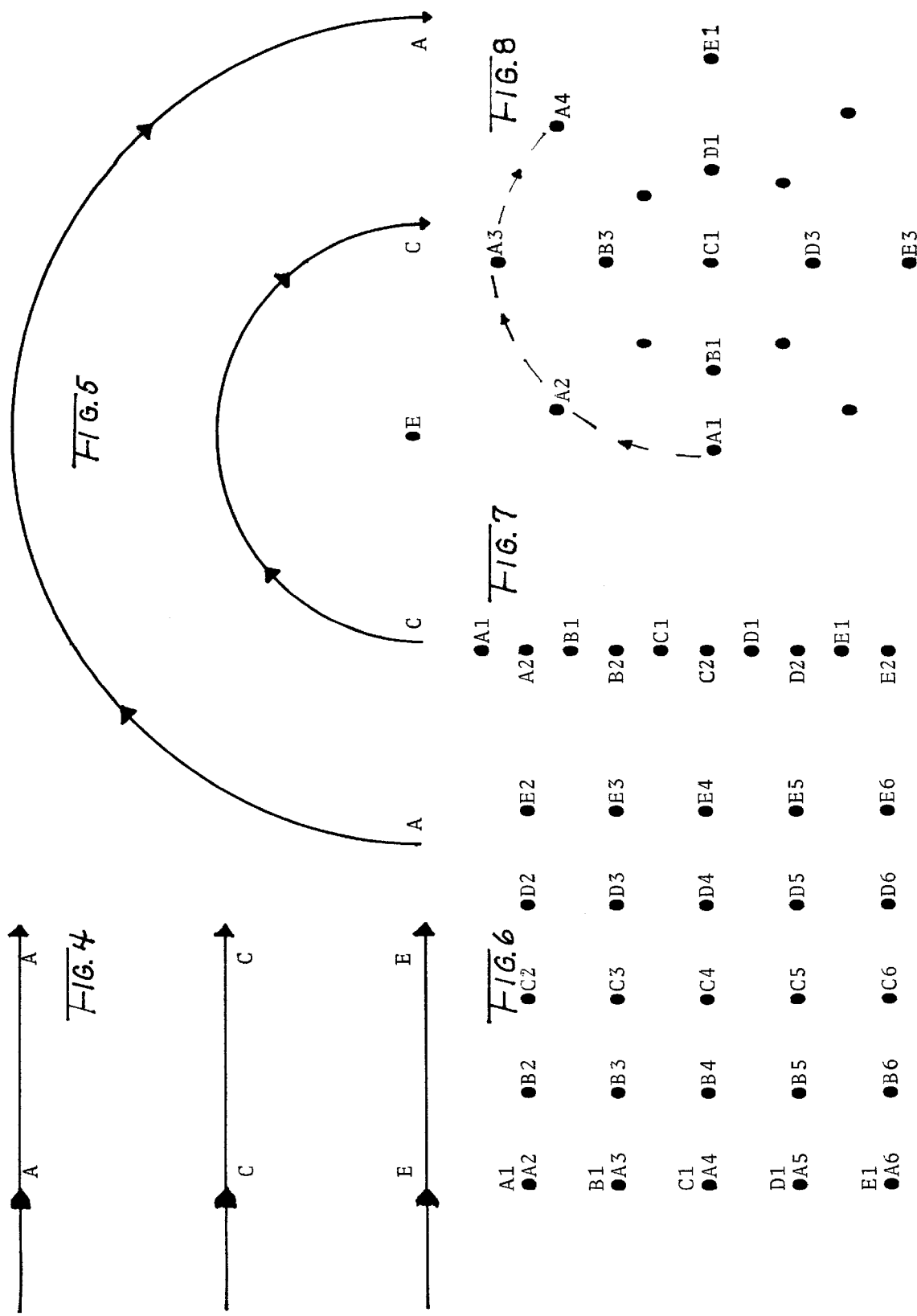

ADJUSTABLE GARDEN PLANTING-DEPTH AND SPACING TOOL

CROSS-REFERENCE TO RELATED APPLICATION

This application claims benefit of provisional application Ser. No. 60/075,770 filed Feb. 23, 1998.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to a hand tool for making drills and furrows in nursery flats or open-ground gardens that contain properly prepared soil.

Back-yard gardeners as well as small-scale commercial growers are continually trying to plant more crops in less space. This tool enables a grower to more efficiently plant seeds/transplants by using wide-row and equidistance plantings. By planting seeds in drills only, instead of open rows, it eliminates thinning and wasting seeds. This tool allows growers to make many more drills or furrows in less time than any other hand tool available, plus it's adjustable to accommodate a variety of crop planting-depths and spacing requirements.

BRIEF SUMMARY OF THE INVENTION

This invention is directed to a gardening hand tool for making drills and furrows in prepared soil in either nursery flats or open gardens. The object of the invention is to provide an adjustable tool to make drills and furrows of different depths and spacings, faster and easier.

The adjustable garden planting-depth and spacing tool consists of a handle with five holes drilled through it, in a straight line and equidistance, and five round pegs. The pegs are identical in width and length with one end pointed. One to five pegs can be inserted in the handle and secured by hitch pins, one above and one below the handle, through the two holes in each peg, The number of pegs inserted determines the spacing required for the particular crop to be sown. (See Chart).

Once the pegs are in place, you can begin making drills in the soil by placing the pointed pegs at a 90° angle into the soil to the desired depth. Gently rock the handle from side-to-side to firm the soil surrounding the drills. Remove the tool from the soil and plant seeds/transplants in the drills.

To form furrows, (straight, circular, etc.) insert pegs as stated above. By holding the tool with the pegs resting on the soil at a 45° angle, drag the tool across the area to be sown. The amount of drag pressure applied determines the depth of the furrows

CHART

| Pegs in Holes | No. of Drills or Furrows | Spacing |
| --- | --- | --- |
| A + B + C + D + E = | 5 | 4.5" Beets, onions |
| A + C + E = | 3 | 9" Corn, peas |
| A + D = | 2 | 13.5" Beans, chard |
| A + E = | 2 | 18" Tomato, squash |

BRIEF DESCRIPTION OF THE SEVERAL VIEWS OF THE DRAWING

FIG. 1 depicts the top view of the unassembled parts of the adjustable garden planting-depth and spacing tool with one of ten hitch pins shown.

FIG. 2 is an elevation view of the tool with pegs inserted in holes A, C and B at " spacing.

FIG. 3 is an elevation view of the tool with pegs inserted in holes A–E at 4" depth and 4½" spacing, making drills in soil.

FIG. 4 depicts straight furrows formed (½ scale) by the tool in FIG. 2.

FIG. 5 depicts the semi-circular furrows formed (½ scale) by the tool in FIG. 2.

FIG. 6 demonstrates the 25 equidistance drills formed (½ scale) by the tool shown in FIG. 3, by inserting the tool six times.

FIG. 7 depicts ten drills formed (½ scale) by the tool in FIG. 3, by inserting the tool two times.

FIG. 8 demonstrates a unique pattern of drills formed (½ scale) with the tool in FIG. 3, by inserting the tool four times.

DETAILED DESCRIPTION OF THE INVENTION

Referring to FIG. 1, insert pegs into holes A, C and E. (See FIG. 2) Secure the pegs in the handle by inserting one hitch pin through the top hole in the peg and one hitch pin below the handle in the lower hole in the peg. By dragging the tool across the area to be sown and applying downward pressure, the furrows in FIG. 4 are formed.

The tool in FIG. 2 can make two equidistance semi-circular furrows with peg E as the pivot point. Partially insert peg E in the soil and swing the opposite end of the handle 180° to form the furrows in FIG. 5.

The tool is forming drills in open ground in prepared soil in FIG. 3. All five pegs are inserted and secured. FIG. 6 shows 25 equidistance drills made by inserting the tool six times. Insert the tool from top (A1) to bottom (E1) on the left side of the row. Remove tool and rotate tool end E upward 90° to the right while allowing peg A to remain above its drill A1. Reinsert peg A into A1 drill and a second row is formed (A2–E2). Now place A peg in the B1 drill, insert, remove and proceed to C1, D1 and E1.

The drills in FIG. 7 were formed by the tool in FIG. 3. By inserting the tool from top (A1) to bottom (E1), five drills are made Reposition the A peg between drills A1 and B1 and insert tool and remove, five more drills are formed (A2–E2) in a straight row.

The drills in FIG. 8 were formed by the tool in FIG. 3. Insert the tool in the soil from left (A1) to right (E1). Remove and rotate the tool 45° clockwise by using drill C1 as a pivot hole, insert, remove and rotate two more times. Some drill numbers intentionally omitted to more clearly reveal the pattern.

While there has been shown and described a preferred embodiment of the adjustable garden planting-depth and spacing tool of this invention, it is understood that changes in structure, materials, sizes, and shapes can be made by those skilled in the art without departing from the invention.

I claim:

1. A garden hand tool used to make multiple drills or furrows in soil, at various depths when said tool is rocked, and at various spacings, in which to plant seeds or transplants comprising: a handle with multiple holes in which to insert two or more pegs, said pegs to be secured to said handle temporarily by pins, each peg being secured to said handle by a pin above said handle and by a pin below said handle, allowing a user to vary a desired distance between drills or furrows.

* * * * *

UNITED STATES PATENT AND TRADEMARK OFFICE
CERTIFICATE OF CORRECTION

PATENT NO. : 6,142,241
DATED : Nov. 7, 2000
INVENTOR(S) : Linda Rae Finley

It is certified that error appears in the above-identified patent and that said Letters Patent is hereby corrected as shown below:

Column 2, line 17,
in holes A, C and E at 9" spacing.

Signed and Sealed this

Twenty-ninth Day of May, 2001

Attest:

NICHOLAS P. GODICI

*Attesting Officer*        *Acting Director of the United States Patent and Trademark Office*